(12) United States Patent
Blakeman

(10) Patent No.: US 11,585,435 B2
(45) Date of Patent: Feb. 21, 2023

(54) GEAR SHIFT SYSTEM

(71) Applicant: Ian Blakeman, Nantwich (GB)

(72) Inventor: Ian Blakeman, Nantwich (GB)

( * ) Notice: Subject to any disclaimer, the term of this patent is extended or adjusted under 35 U.S.C. 154(b) by 0 days.

(21) Appl. No.: 16/636,602

(22) PCT Filed: Aug. 2, 2018

(86) PCT No.: PCT/GB2018/052212
§ 371 (c)(1),
(2) Date: Feb. 4, 2020

(87) PCT Pub. No.: WO2019/025806
PCT Pub. Date: Feb. 7, 2019

(65) Prior Publication Data
US 2021/0163099 A1    Jun. 3, 2021

(30) Foreign Application Priority Data

Aug. 4, 2017 (GB) .................................. 1712581
Feb. 26, 2018 (GB) .................................. 1803057

(51) Int. Cl.
*F16H 59/02* (2006.01)
*B62K 23/08* (2006.01)
(Continued)

(52) U.S. Cl.
CPC ............ *F16H 59/02* (2013.01); *B62K 23/08* (2013.01); *B62M 25/06* (2013.01); *F16H 59/04* (2013.01);
(Continued)

(58) Field of Classification Search
CPC ................ B62M 25/06; F16H 59/04; F16H 2059/0234; F16H 2059/0239; B62K 23/08
See application file for complete search history.

(56) References Cited

U.S. PATENT DOCUMENTS 3,919,896 A * 11/1975 Foster .................... B62K 23/08
                                                      74/473.16
4,061,051 A * 12/1977 Grandis ................ B62M 25/06
                                                      74/473.16
(Continued)

FOREIGN PATENT DOCUMENTS

CN         203228912 U     10/2013
DE         10243999 A1      4/2004
(Continued)

OTHER PUBLICATIONS

PCT/GB2018/052212 International Search Report and Written Opinion dated Nov. 28, 2018, 10 pages.
(Continued)

*Primary Examiner* — Victor L MacArthur
(74) *Attorney, Agent, or Firm* — Lathrop GPM LLP

(57) ABSTRACT

A device for a gear shift system for a vehicle, the gear shift system comprising a gear shift member, the device comprises a device member, and a member connector configured to connect to the gear shift member and thereby connect the device to the gear shift system so that, in use, one of the device member and the gear shift member is beneath a rider's foot to provide a first member, and the other of the device member and the gear shift member is above the rider's foot to provide a second member, wherein in use downwards movement of the first member effects a first gear shift and in use upwards movement of the second member effects a second gear shift.

18 Claims, 6 Drawing Sheets

(51) Int. Cl.
   *B62M 25/06*   (2006.01)
   *F16H 59/04*   (2006.01)
   *B62J 25/08*   (2020.01)

(52) U.S. Cl.
   CPC ....... *B62J 25/08* (2020.02); *F16H 2059/0234* (2013.01); *F16H 2059/0239* (2013.01)

(56) References Cited

U.S. PATENT DOCUMENTS

| | | | | |
|---|---|---|---|---|
| 4,083,263 | A | * | 4/1978 | Lundquist .............. B62K 23/08 74/473.16 |
| 4,585,087 | A | * | 4/1986 | Riccitelli ................. B62M 9/00 180/219 |
| 5,507,200 | A | * | 4/1996 | Reed ........................ B62H 1/02 280/291 |
| 5,661,999 | A | * | 9/1997 | Carone .................. B62M 25/06 280/291 |
| 2009/0090578 | A1 | * | 4/2009 | Ross ...................... B62M 25/06 180/364 |
| 2009/0255360 | A1 | * | 10/2009 | Witteveen ............... F16H 59/02 74/473.16 |
| 2009/0272215 | A1 | * | 11/2009 | Plackis .................. B62K 23/08 74/473.16 |
| 2016/0114860 | A1 | * | 4/2016 | Sattamini ................. G05G 1/34 74/473.16 |
| 2016/0297493 | A1 | * | 10/2016 | Lacasse-Jobin ....... B62M 17/00 |

FOREIGN PATENT DOCUMENTS

| | | |
|---|---|---|
| FR | 3037034 A1 | 12/2016 |
| JP | S5817296 U | 2/1983 |
| JP | S615296 U | 1/1986 |
| JP | 2005162184 A | 6/2005 |

OTHER PUBLICATIONS

GB Patent Application No. 1803057.7 Search Report dated Apr. 12, 2018, 4 pages.
GB Patent Application No. 1712581.6 Combined Search and Examination Report dated Jan. 18, 2018, 7 pages.

* cited by examiner

GEAR SHIFT SYSTEM

The invention relates to a gear shift system for a vehicle, a device for a gear shift system for a vehicle and a method of modifying a gear shift system of a vehicle Gear shift systems (for example for motorcycles) are often operated by a user's (for example a rider's) foot. Such gear shift systems include a member, with the user placing their foot below or above the member to push the member upwards or downwards by to change gear upwards or downwards respectively.

It is an aim of the present invention to solve or avoid problems with gear shift systems, whether identified herein or elsewhere, or to provide an improved gear shift system or related methodology.

According to a first aspect of the invention, there is provided a device for a gear shift system for a vehicle, the gear shift system comprising a gear shift member (i.e. an "existing gear shift member" or "peg"), the device comprising a device member (i.e. an "additional gear shift member"), and a member connector configured to connect to the gear shift member and thereby attach/connect the device to the gear shift system so that, in use, one of the device member and the gear shift member is beneath a rider's foot to provide a first member, and the other of the device member and the gear shift member is above the rider's foot to provide a second member, wherein in use downwards movement of the first member effects a first gear shift and in use upwards movement of the second member effects a second gear shift.

This device is advantageous as it allows the user to perform both the first gear shift and the second gear shift without having to move their foot from between the first member and the second member or having to move their foot above and below a member. This increases the speed with which a user may perform gear shifts, and/or increases the safety of using the vehicle. The device is connected to an existing gear shift system to achieve these advantages, which is easier and/or cheaper than installing a completely new gear shift system.

Additionally, connecting the device to the gear shift member is particularly advantageous, as it means that the gear shift member and the device member can be better aligned in a horizontal direction (i.e. in a direction of travel of the vehicle). This is in contrast to systems in which a device may be connected to the gear shift bracket, which can lead to problems, as the gear shift brackets of different motorcycles are different shapes and bend in different ways, resulting in poor alignment of the first and second members. This means that in a system in which the device is connected to the gear shift bracket, the device must be redesigned for each different type of motorcycle.

Additionally, on different motorcycles, the gear shift bracket can extend in a forward or a backward direction on the motorcycle, and it is difficult to design a device fixable to a gear shift bracket extending in either direction. These problems are overcome by having a device connectable to the gear shift member itself.

In one example, the device further comprises a device bracket connecting the device member to the member connector.

In one example, the device bracket is pivotably connected to the member connector. This allows the device bracket to be pivoted with respect to the gear shift member in use, thereby allowing the relative horizontal positions of the device member and the gear shift member to be adjusted.

In one example, the member connector is configured to grip at least a portion of the gear shift member.

In one example, the member connector is a sleeve configured to receive and grip the at least a portion of the gear shift member.

In one example, an in use distance between the first member and the second member is adjustable by moving the device member with respect to the gear shift member. In one example, the device member is slidable along the bracket to adjust the in use spacing between the first member and the second member.

According to a second aspect of the invention, there is provided a gear shift system comprising a gear shift member and a device as described above, wherein the member connector of the device is connected to the gear shift member.

In one example, the first gear shift is a downward gear shift.

In one example, the second gear shift is an upward gear shift.

In one example, the vehicle is a motorcycle.

According to a third aspect of the invention, there is provided a method of modifying a gear shift system of a vehicle, the gear shift system comprising a gear shift member (i.e. "an existing gear shift member"), the method comprising attaching/connecting a device to the gear shift member so that, in use, one of a device member (i.e. "an additional gear shift member") of the device and the gear shift member is beneath a rider's foot to provide a first member, and the other of the device member and the gear shift member is above the rider's foot to provide a second member, so that in use downwards movement of the first member effects a first gear shift and in use upwards movement of the second member effects a second gear shift.

Attaching/connecting the device in this way is advantageous as it allows the user of the vehicle to perform both the first gear shift and the second gear shift without having to move their foot from between the first member and the second member or having to move their foot above and below a member. This increases the speed with which a user may perform gear shifts, and/or increases the safety of using the vehicle. The device is connected to an existing gear shift system to achieve these advantages, which is easier and/or cheaper than installing a completely new gear shift system.

Additionally, connecting the device to the gear shift member is particularly advantageous, as it means that the gear shift member and the device member can be better aligned in a horizontal direction. This is in contrast to systems in which a device may be connected to the gear shift bracket, which can lead to problems, as the gear shift brackets of different motorcycles are different shapes and bend in different ways, resulting in poor alignment of the first and second members. Additionally, the gear shift bracket can extend in a forward or a backward direction on the motorcycle, and it is difficult to design a device fixable to a gear shift bracket extending in either direction. These problems are overcome by connecting the device to the gear shift member itself.

In one example, the method further comprises removing a cover from the gear shift member before connecting the device to the gear shift member. Such a cover provides a more comfortable surface for contacting the user's foot, but removing the cover before connecting the device means that the gear shift member can be less bulky after connection of the device. Additionally, as the member connector of the device (i.e. the portion which connects to the gear shift member) may be made from a similar material to the cover, the surface contacted by the user may still be comfortable after fitting of the device. In other examples, the cover is left in place on the gear shift member when the device is connected to the gear shift member. This means that the cover continues to provide the more comfortable surface for contacting the user's foot after the device is connected.

According to a fourth aspect of the invention, there is provided a gear shift system for a vehicle, the gear shift system comprising: a first member adapted to position beneath a user's foot in use; and a second member adapted to position above the user's foot in use, wherein in use downwards movement of the first member effects a first gear shift and in use upwards movement of the second member effects a second gear shift.

This applicant has realised that prior art gear shift systems, as described above, are inconvenient, as the user often needs to move their foot from one side of the member to the other to perform a gear shift. The gear shift system of the first aspect is advantageous, as it allows the user to perform both the first gear shift and the second gear shift without having to move their foot from between the first member and the second member or having to move their foot above and below a member. This increases the speed with which a user may perform gear shifts, and/or also increases the safety of using the vehicle, and increasing comfort and control. In vehicles where a separate foot rest is provided, the user may rest a portion of their foot on the foot rest, whilst also maintaining their foot between the first member and the second member, further increasing comfort for the user.

In one example, the first gear shift is in a different direction from the second gear shift. In one example, the first gear shift is a downward gear shift. In one example, the second gear shift is an upward gear shift. This means that the user can perform both an upward gear shift and a downward gear shift without moving their foot from between the first member and the second member.

In one example, an in use vertical spacing between the first member and the second member is adjustable. This allows feet of different sizes and with different footwear to be accommodated between the first member and the second member. It will be appreciated that a vertical spacing is a spacing having at least a vertical component.

In one example, the first member and the second member are substantially vertically aligned in an in use default position. This means that the user can perform both the first gear shift and the second gear shift without moving their foot horizontally, or at least not to the extent required in prior art systems.

In one example, an in use horizontal spacing between the first member and the second member is adjustable. The horizontal spacing is the spacing between the first member and the second member in an in use direction which is substantially parallel to the direction of travel of the vehicle. This spacing is away from the default position described above. It will be appreciated that a horizontal spacing is a spacing having at least a horizontal component.

In one example, the first member is supported by a first bracket in use and the second member is supported by a second bracket in use. This allows the first bracket and the second bracket to be mounted to the vehicle, in many cases at a vehicle pivot, with rotation of the first bracket and the second bracket about the pivot point effecting a gear shift.

In one example, at least one of the first member and the second member is a rotatable member, the rotatable member rotatable about a member pivot, the member pivot mounted on the rotatable member's respective bracket, wherein the member pivot is displaced relative to a centre of the rotatable member, such that rotation of the rotatable member about the member pivot effects adjustment of the vertical spacing.

In one example, the second bracket is selectively rotatable relative to the first bracket to adjust the vertical spacing.

In one example, each of the first bracket and the second bracket comprises a series of offset holes to allow the first bracket and second bracket to be fixed in different rotational positions relative to each other.

In one example, the second bracket is slidable relative to the first bracket to adjust the horizontal spacing.

In one example, the vehicle is a motorcycle, which is a vehicle for which the invention is very well suited in terms of improving operation and safety.

According to a fifth aspect of the invention, there is provided a vehicle comprising a gear shift system as described above.

According to a sixth aspect of the invention, there is provided a device for a gear shift system for a vehicle, the gear shift system comprising a gear shift member, the device comprising a device member connectable to the gear shift system so that, in use, one of the device member and the gear shift member is beneath a rider's foot to provide a first member, and the other of the device member and the gear shift member is above the rider's foot to provide a second member, wherein in use downwards movement of the first member effects a first gear shift and in use upwards movement of the second member effects a second gear shift.

This device is advantageous as it allows the user to perform both the first gear shift and the second gear shift without having to move their foot from between the first member and the second member or having to move their foot above and below a member. This increases the speed with which a user may perform gear shifts, and/or increases the safety of using the vehicle. The device may be connected to an existing gear shift system to achieve these advantages, which might be easier and/or cheaper than installing a completely new gear shift system.

The device of the third aspect may include any of the features of the gear shift system of the first aspect, and may be applied to a vehicle as in the second aspect.

According to a seventh aspect of the invention, there is provided a method of modifying a gear shift system of a vehicle, the gear shift system comprising a gear shift member, the method comprising connecting a device member to the gear shift system so that, in use, one of the device member and the gear shift member is beneath a rider's foot to provide a first member, and the other of the device member and the gear shift member is above the rider's foot to provide a second member, and so that in use downwards movement of the first member effects a first gear shift and in use upwards movement of the second member effects a second gear shift.

This method is advantageous as it allows the user to perform both the first gear shift and the second gear shift without having to move their foot from between the first member and the second member. This increases the speed with which a user may perform gear shifts, and/or increases the safety of using the vehicle. The method may be applied to an existing gear shift system to achieve these advantages.

For a better understanding of the invention reference is made, by way of example only, to the accompanying figures, in which.

Figure 2:
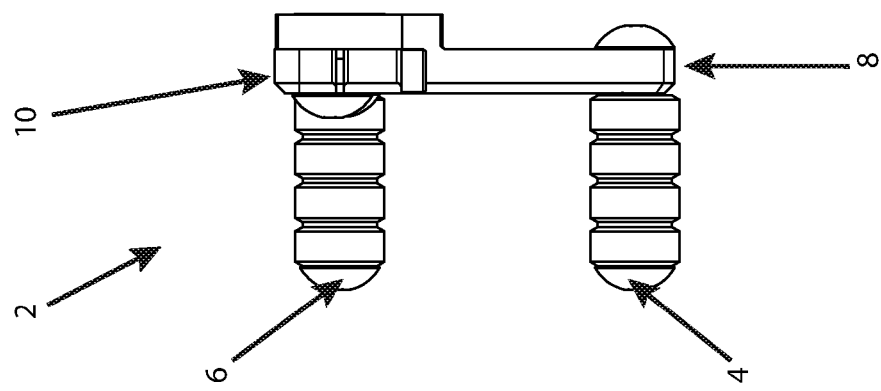
FIG. 2 shows a rear view of a gear shift system.
Figure 1:
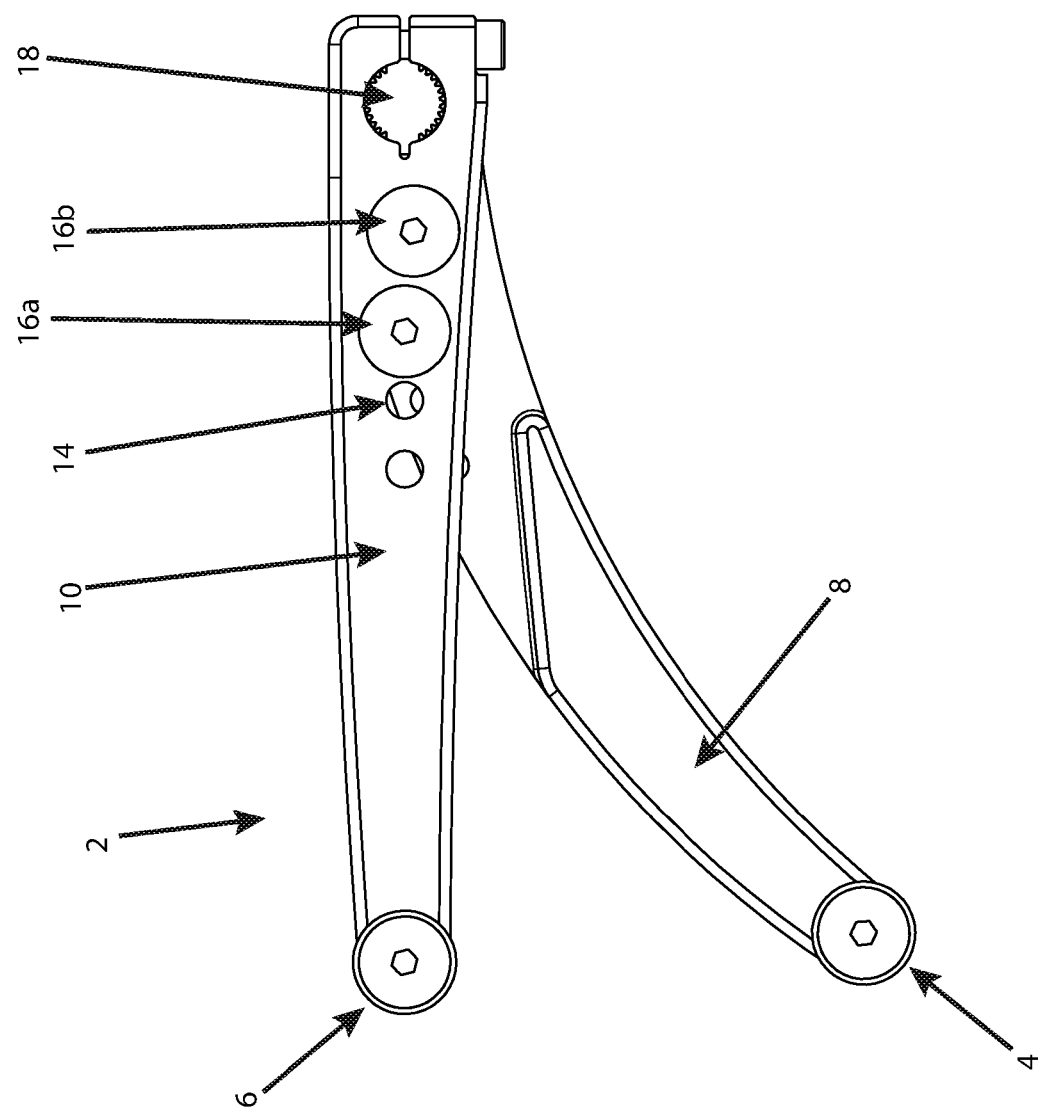
FIG. 1 shows a first side view of a gear shift system.
Figure 4:
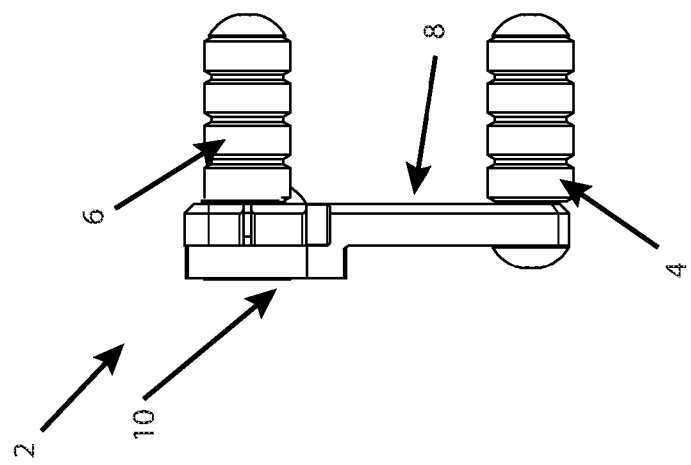
FIG. 4 shows a front view of a gear shift system.
Figure 3:
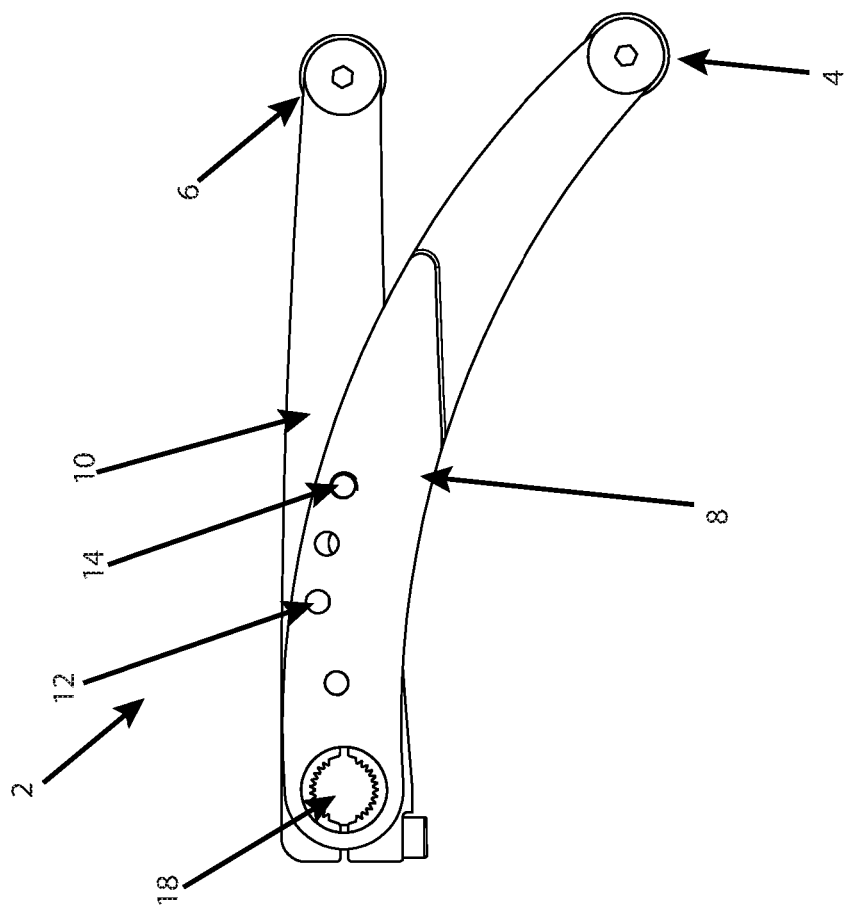
FIG. 3 shows a second side view of a gear shift system.

Referring to FIG. 1 to FIG. 5 there is shown a gear shift system 2. The gear shift system 2 comprises a first member 4 and a second member 6. The first member 4 is supported by a first bracket 8, and the second member 6 is supported by a second bracket 10. The first member 4 is substantially rigidly connected to the first bracket 8 by a bolt. The second member 6 is substantially rigidly connected to the second bracket 10 by a bolt.

The first bracket 8 and the second bracket 10 are located in substantially parallel planes. The first member 4 and the second member 6 extend substantially normally to the planes of the first bracket 8 and the second bracket 10. The first member 4 and the second member 6 are arranged to extend substantially horizontally and transversely to a direction of travel of the vehicle in use. Each of the first member 4 and the second member 6 is substantially cylindrical, and includes a ridged outer surface to increase grip between the first member 4 and the second member 6 and a user's foot.

The first bracket 8 comprises a first series of holes 12. The second bracket 10 comprises a second series of holes 14. The gear shift system 2 comprises a first bolt 16a and a second bolt 16b. The first bolt 16a extends through a hole of the first series of holes 12 and a hole of the second series of holes 14. The second bolt 16b extends through a hole of the first series of holes 12 and a hole of the second series of holes 14. The first bolt 16a and the second bolt 16b thereby fix the first bracket 8 and the second bracket 10 to each other.

Figure 5:
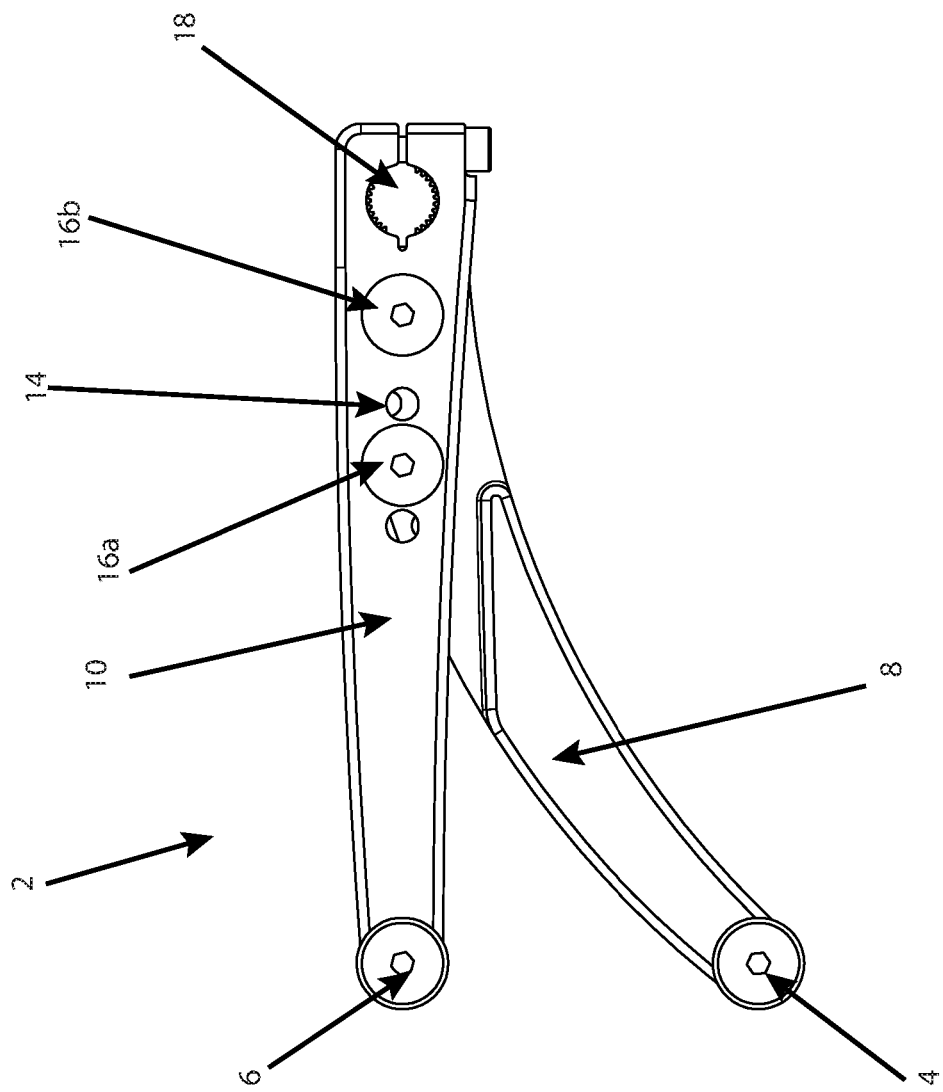
FIG. 5 shows a front view of a gear shift system.

The holes of the first series of holes 12 and the holes of the second series of holes 14 are offset, such that positioning the first bolt 16a and/or the second bolt 16b through different holes varies the rotational positions of the first bracket 8 and the second bracket 10 relative to each other. This means that the first bracket 8 is rotatable relative to the second bracket 10, allowing a vertical spacing between the first member 4 and the second member 6 to be adjusted. FIG. 5 shows the first bracket 8 and the second bracket 10 in a different relative rotational position to in FIG. 1, and it can be seen that the vertical spacing is different.

The first bracket 8 fixes to a vehicle pivot in use, by clamping of an adjustable aperture 18 (tightened by a screw) of the first bracket 8 on the vehicle pivot. The second bracket 10 fixes to the vehicle pivot in use, by clamping of an adjustable aperture 18 (tightened by a screw) of the second bracket 10 on the vehicle pivot 18. The vehicle is a vehicle which has a foot operated gear shift system. More specifically, the vehicle is a motorcycle, which is perhaps the most common example of a vehicle employing such a system.

Rotation of the vehicle pivot effects a gear shift. More specifically, rotation of the vehicle pivot in an anti-clockwise direction in FIG. 1 effects a first gear shift, and rotation of the vehicle pivot in a clockwise direction as shown in Figure effects a second gear shift. The first gear shift is in a different direction from the second gear shift. More specifically, one of the first gear shift and the second gear shift is an upward gear shift, and the other of the first gear shift and the second gear shift is a downward gear shift. More specifically, the first gear shift is a downward gear shift, and the second gear shift is an upward gear shift.

In use, the user's foot is positioned between the first member 4 and the second member 6, such that the first member 4 positions beneath the user's foot and the second member 6 positions above the user's foot. Downwards movement of the first member 4 effects the first gear shift, as the downwards movement of the first member 4 causes rotation of the first bracket 8, which causes rotation of the vehicle pivot in the anticlockwise direction. Upwards movement of the second member 6 effects the second gear shift, as the upwards movement of the second member 6 causes rotation of the second bracket 10 in the clockwise direction. When the vehicle is a motorcycle, as in the present case, the user is a rider of the motorcycle.

In other embodiments, only one of the first bracket 8 and the second bracket 10 fixes to the vehicle pivot, with the connection between the first bracket 8 and the second bracket 10 allowing the gear shift system 2 to perform the first gear shift and the second gear shift as described above.

Figure 6:
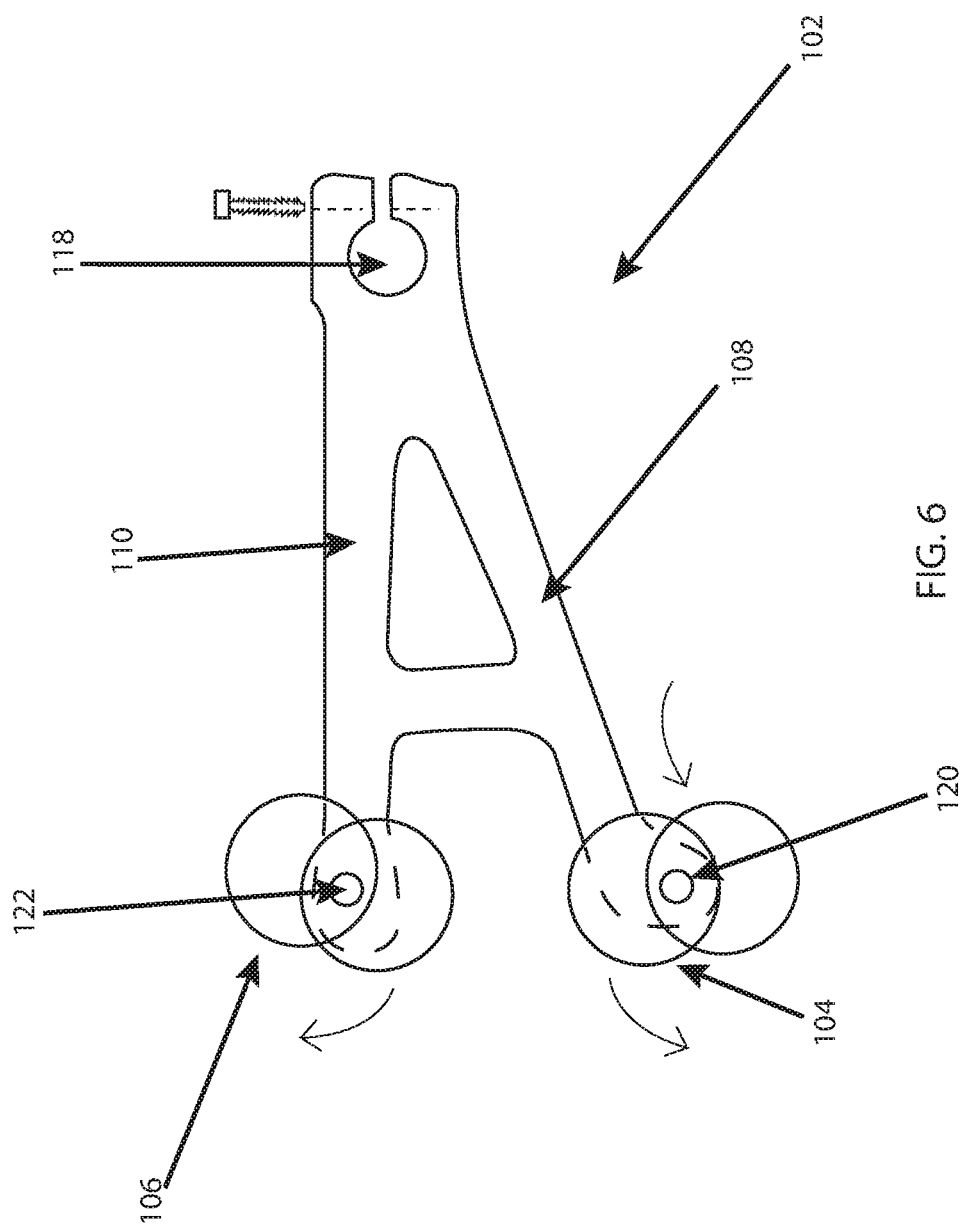
FIG. 6 shows a side view of a gear shift system.

Referring to FIG. 6, there is shown a second gear shift system 102. The second gear shift system 102 comprises many of the same features as the first gear shift system 2, with only the differences described here.

The second gear shift system 102 comprises a first member 104 and a second member 106. Again, the first member 104 is supported by a first bracket 108, and the second member 106 is supported by a second bracket 110. In this case, the brackets have a fixed positional relationship relative to one another, and so reconfiguration to vary spacings in or of the system are implemented in a different way to that described previously. Unlike the gear shift system 2 of earlier Figures, the second gear shift system 102 of FIG. 6 comprises a first member pivot 120, which is mounted to the first bracket 108. The first member 104 is a rotatable member, rotatable about the first member pivot 120. The first member pivot 120 is displaced relative to a centre of the first member 104, such that rotation of the first member 104 about the first member pivot 120 causes displacement of the first member 104 in an in use vertical direction, thereby allowing a vertical spacing between the first member 104 and the second member 106 to be adjusted.

Additionally, the second gear shift system 102 comprises a second member pivot 122, which is mounted to the second bracket 110. The second member 106 is a rotatable member, rotatable about the second member pivot 122. The second member pivot 122 is displaced relative to a centre of the second member 106, such that rotation of the second member 106 about the second member pivot 122 causes displacement of the second member 106 in an in use vertical direction, thereby allowing a vertical spacing between the first member 104 and the second member 106 to be adjusted. When the desired vertical spacing is achieved, the user may prevent further rotation of the first member 104 and the second member 106 using screws to tighten apertures (not shown) in which the member pivots are located.

As discussed briefly above, the first bracket 108 and the second bracket 110 are integrally formed with each, such that their position with respect to each other is substantially fixed. The first bracket 108 and the second bracket 110 share an aperture 118, which fixes to the vehicle pivot in the same manner as in the gear shift system 2. Aside from the differences in adjustment of vertical spacing between the first member 104 and the second member 106, the second gear shift system 102 operates in substantially the same way as the gear shift system 2 described previously.

Figure 7:
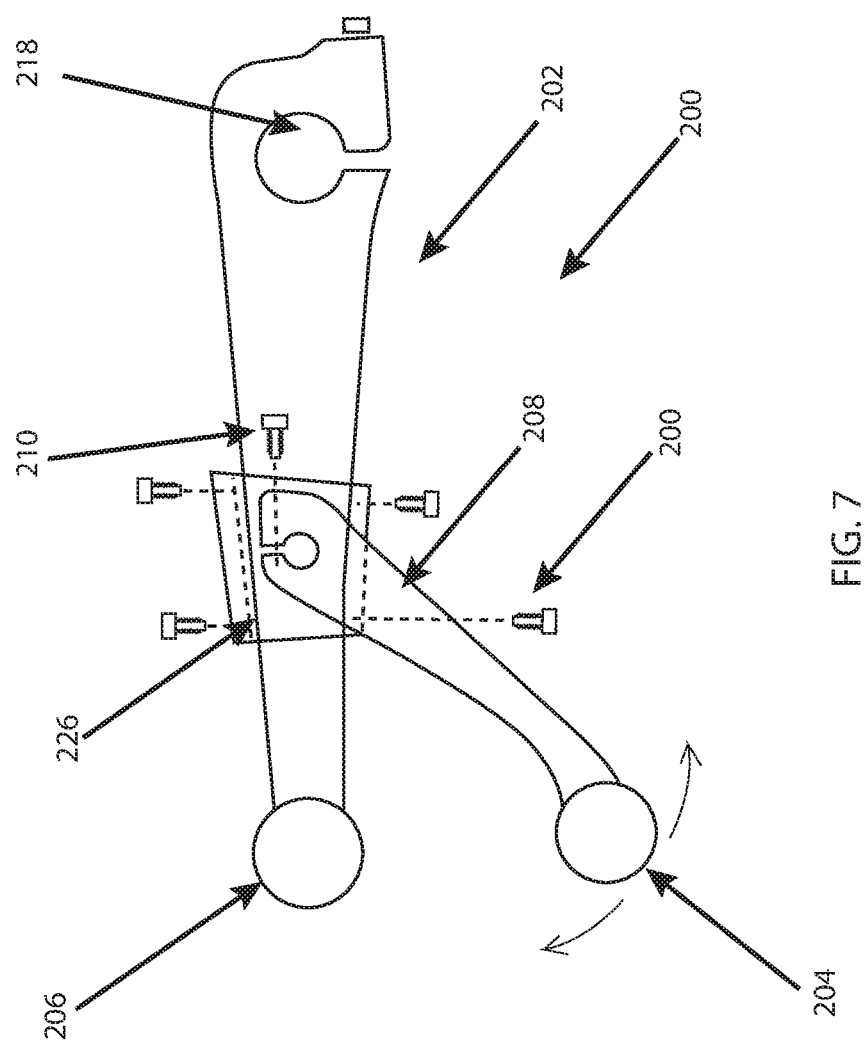
FIG. 7 shows a side view of a device in a gear shift system.

Referring to FIG. 7, there is shown a device 200 for a third gear shift system 202. The third gear shift system 202 comprises a gear shift member 206. The gear shift member 206 is supported by a gear shift bracket 210. The third gear shift system 202 comprises an aperture 218, adapted to fix to the vehicle pivot in use in the same manner as described above.

The device 200 comprises a device member 204. The device member 204 is supported by a device bracket 208. The device comprises a connector 226. The connector 226 comprises a sleeve through which the gear shift bracket 210 is locatable. The sleeve of the connector is slidable along the gear shift bracket 210, allowing a horizontal spacing between the device member 204 and the gear shift member 206 to be adjusted. A series of screws allows the position of the connector 226 on the gear shift bracket to be fixed.

The device 200 comprises a connector pivot 228. The connector pivot 228 provides a rotatable mounting for the device bracket 208 on the gear shift bracket 210. This means that the device bracket 208 is rotatable relative to the gear shift bracket 210, to adjust an in use vertical spacing between the device member 204 and the gear shift member 206. A screw is used to fix the device bracket 208 relative to the gear shift bracket 210 and prevent rotation.

The device 200 is used to modify the third gear shift system 202 to form a modified gear shift system 300. The device member 204 is connected to the gear shift bracket 210 by the connector 226. The third gear shift system 202 is an existing gear shift system, with the device 200 retrofitted to the third gear shift system 202.

In use, one of the device member 204 and the gear shift member 206 is beneath a rider's foot to provide a first member, and the other of the device member and the gear shift member is above the rider's foot to provide a second member. More specifically, the device member 204 provides the first member 204, and the gear shift member 206 provides the second member 206. The modified gear shift system then operates in the same way as the gear shift system 2 and the second gear shift system 102, as described above, with downwards movement of the first member 204 effecting the first gear shift and upwards movement of the second member 206 effecting the second gear shift.

In a related example to that of FIG. 7, a device having a gear shift member could be attached to the pivot of the vehicle (i.e. a pivot of its gear system) to achieve the same or similar functionality. That is, the (additional) gear shift member does not necessarily need to be attached directly to an existing gear shift member. This might mean that it therefore easier to retrofit a member that provides the functionality described herein.

In a further example related to that of FIG. 7, rather than connecting to the gear shift bracket 210 using the connector 226 as shown, the device is a twin device which replaces the gear shift member 206, with the twin device providing two device members as the first member and the second member. In this case, the first member and the second member are connected to each other by a twin bracket, which may extend substantially vertically in use. In this example, a new gear shift system according to the invention is used to replace the existing gear shift member 206. This means that the bracket(s) can remain intact, making it even easier to retrofit the apparatus, and provide the improved gear shift functionality.

Figure 8:
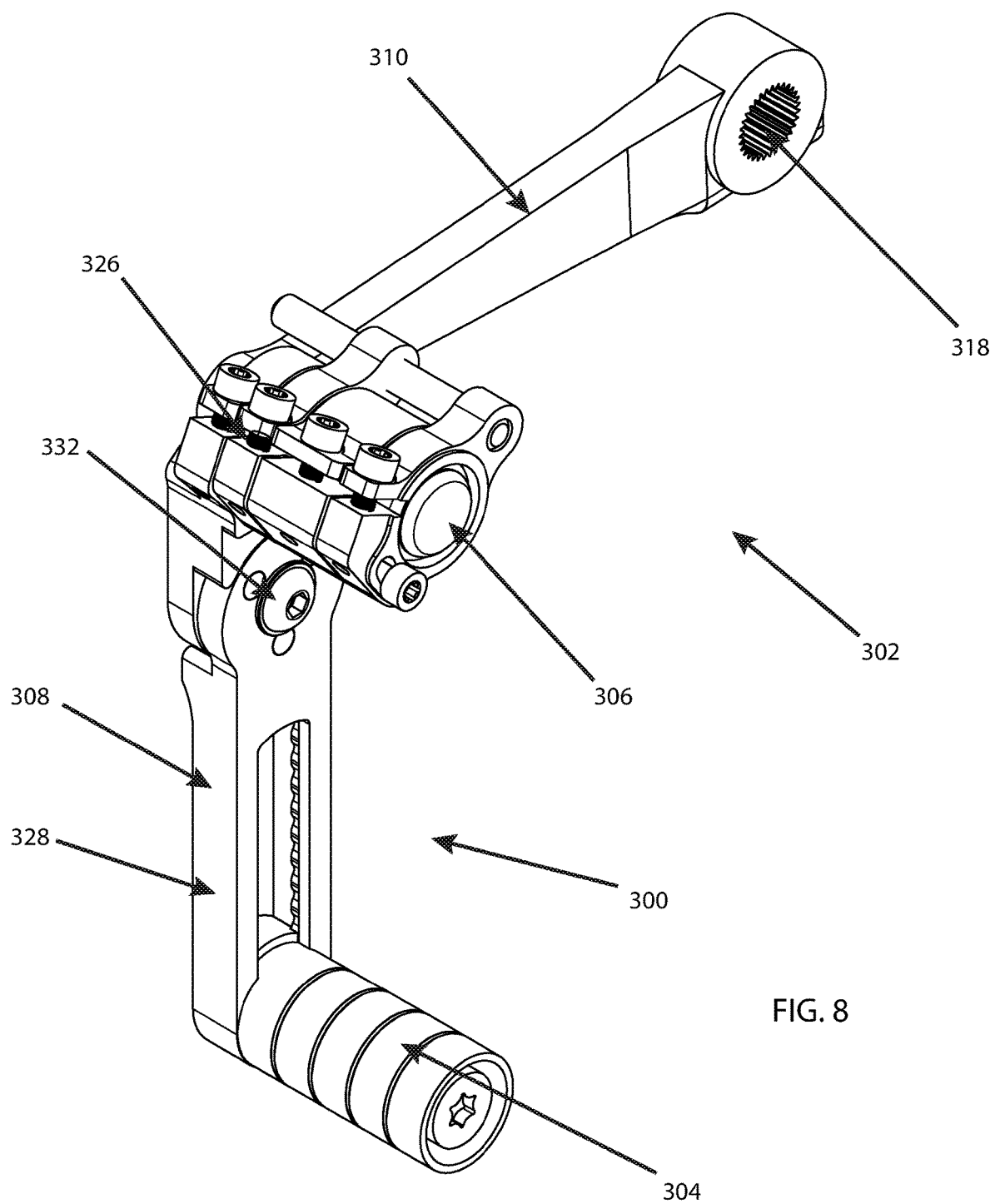
FIG. 8 shows a perspective view of a device in a gear shift system.

Referring to FIG. 8, there is shown a device 300 for a fourth gear shift system 302. The fourth gear shift system 302 comprises a gear shift member 306. The gear shift member 306 is supported by a gear shift bracket 310. The fourth gear shift system 302 comprises an aperture 318, adapted to fix to the vehicle pivot in use in the same manner as described above.

The device 300 comprises a device member 304. The device member 304 is supported by a device bracket 308. The device 300 comprises a member connector 326. The member connector 326 comprises a sleeve through which the gear shift member 306 is locatable. The member connector 326 grips the gear shift member 306 to thereby connect the device member 304 to the gear shift member 306 to form a part of the fourth gear shift system 302. A series of bolts allows the member connector 326 to be tightened on the gear shift member 306. The inside of the sleeve is textured to increase the friction between the member connector 326 and the gear shift member 306.

The device bracket 308 is pivotably connected to the member connector 326 at a bracket pivot 332. This allows the device bracket 308 to be pivoted with respect to the gear shift member 306 in use, thereby allowing the relative horizontal positions of the device member 304 and the gear shift member 306 to be adjusted. However, in some simpler examples, no such bracket pivot is provided and the device bracket 308 is rigidly fixed to the member connector 326.

The device bracket 308 comprises a slot, in which the device member 304 is held and is slidable. This allows an in use distance between the device member 304 and the gear shift member 306 to be adjusted.

The device 300 is used to modify the existing part of the fourth gear shift system 302 to form the fourth gear shift system 302. The member connector 326 is connected to the gear shift member 306. A part of the fourth gear shift system 302 (i.e. the gear shift member 306 and the gear shift bracket 310) is an existing gear shift system, with the device 300 retrofitted to form part of the fourth gear shift system 302. A cover (not shown) may be removed from the gear shift member 306 before connecting the device 300 to the gear shift member 306. However, in other examples, the cover is left in place, and continues to provide a surface contacted by the user after the device is connected to the gear shift member.

In use, one of the device member 304 and the gear shift member 306 is beneath a rider's foot to provide a first member, and the other of the device member and the gear shift member is above the rider's foot to provide a second member. More specifically, the device member 304 provides the first member 304, and the gear shift member 306 provides the second member 306. The modified gear shift system then operates in the same way as the gear shift system 2, the second gear shift system 102 and the third gear shift system 202, as described above, with downwards movement of the first member 304 effecting the first gear shift and upwards movement of the second member 306 effecting the second gear shift.

In a further example, and generally speaking, one of the first and second members is retractable (for example by folding or rotating), so that the gear shift system may provide only a single member (or first and second members) as and when required. The member that is retractable may be maintained in a retracted state by a push fit, a clip, a notch, or anything that can in some way keep the member in position.

So, in one example an entire new system can be provided that attaches to the vehicle's gear shift pivot. In another example the system may not attach to that pivot, but could be attached to, attached proximal to, or replace an existing member of such a system (e.g. a part which typically comes into contact with a user's toe or foot to change gear). In another example, a device can be added to an existing system, for example by adding another member at the vehicle's gear shift pivot point, or adding a member to an existing member in some way or another.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A device for attachment to an existing gear shift system of a vehicle having a gear shift peg member adapted to fix to a vehicle pivot, the device comprising:
   a device member; and
   a member connector coupled to the device member, the member connector comprising a sleeve through which the gear shift peg member is locatable to attach the device to the gear shift peg member; the device member coupled to and offset from the sleeve so that, in use, a first member includes one of the device member and the gear shift peg member located beneath a rider's foot, and a second member includes the other of the device member and the gear shift peg member located above the rider's foot;
   wherein in-use downwards force onto the first member exerted by a rider's foot effects a first gear shift and in-use upwards force onto the second member exerted by the rider's foot effects a second gear shift.

2. A device according to claim 1, and further comprising a device bracket connecting the device member to the member connector.

3. A device according to claim 2, wherein the device bracket is pivotably connected to the member connector.

4. A device according to claim 2, wherein the device member is slidable along the device bracket to adjust an in-use distance between the first member and the second member.

5. A device according to claim 1, the member connector configured to grip the gear shift peg member via at least one bolt that tightens the member connector onto the gear shift peg member.

6. A device according to claim 1, wherein an in-use distance between the first member and the second member is adjustable by moving the device member with respect to the gear shift peg member.

7. A device according to claim 1, wherein the vehicle is a motorcycle.

8. A device according to claim 1, wherein the first gear shift is a downward gear shift.

9. A device according to claim 1, wherein the second gear shift is an upward gear shift.

10. A gear shift system comprising:
    a gear shift peg member affixed to a vehicle pivot; and
    a device comprising a sleeve through which the gear shift peg member is locatable to attach the device to the gear shift peg member; wherein, in use, a first member of the device is located beneath a rider's foot, and a second member of the device is located above the rider's foot;
    wherein in-use downwards force onto the first member exerted by a rider's foot effects a first gear shift and in-use upwards force onto the second member exerted by the rider's foot effects a second gear shift.

11. A gear shift system according to claim 10, wherein the first gear shift is a downward gear shift.

12. A gear shift system according to claim 10, wherein the second gear shift is an upward gear shift.

13. A vehicle comprising the gear shift system according to claim 10.

14. A gear shift system according to claim 13, wherein the vehicle is a motorcycle.

15. The device according to claim 10, the member connector configured to grip the gear shift peg member via at least one bolt that tightens the member connector onto the gear shift peg member.

16. A method of modifying an existing gear shift system of a vehicle, the gear shift system comprising an existing gear shift peg member,
    the method comprising directly attaching a device to the gear shift peg member, the device including a member connector comprising a sleeve through which the gear shift peg member is locatable to attach the device to the gear shift peg member and a device member coupled to and offset from the sleeve; wherein, in use, a first member includes one of the device member and the gear shift peg member located beneath a rider's foot, and a second member includes the other of the device member and the gear shift peg member located above the rider's foot;
    so that in-use downwards force onto the first member exerted by a rider's foot effects a first gear shift and in-use upwards force onto the second member exerted by the rider's foot effects a second gear shift.

17. A method according to claim 16 and further comprising removing a cover from the gear shift peg member before attaching the device to the gear shift peg member.

18. The method according to claim 16, wherein directly attaching includes tightening a bolt of the device to cause the member connector to tighten onto the gear shift peg member.

* * * * *